S. C. CARTY.
REFRIGERATING APPARATUS.
APPLICATION FILED SEPT. 8, 1917.

1,277,192.

Patented Aug. 27, 1918.

WITNESSES
Frank L. Faggiani.
J. G. Schrott.

INVENTOR
Samuel C. Carty.
BY Munn & Co.
ATTORNEYS

UNITED STATES PATENT OFFICE.

SAMUEL C. CARTY, OF WASHINGTON, NORTH CAROLINA.

REFRIGERATING APPARATUS.

1,277,192.  Specification of Letters Patent.  Patented Aug. 27, 1918.

Application filed September 8, 1917. Serial No. 190,392.

*To all whom it may concern:*

Be it known that I, SAMUEL C. CARTY, a citizen of the United States, and a resident of Washington, in the county of Beaufort and State of North Carolina, have invented a new and useful Improvement in Refrigerating Apparatus, of which the following is a specification.

My invention relates to improvements in refrigerating apparatus, it being directed more particularly to an improved cover for freezing tanks, and it consists in the constructions, combinations, and arrangements herein described and claimed.

An object of my invention is to provide a cover for a freezing tank which is made in sections to cover individual rows of ice cans, so that the cover section of one row of ice cans may be removed, without disturbing the cover sections of the remaining rows of ice cans.

Another object of the invention is to provide a cover for a freezing tank which has a central guide or division strip, the cover for the tank being made in sections to cover individual rows of ice cans, the purpose of the guide or division strip of the freezing tank, being to prevent displacement and over-lapping of the cover sections.

Another object of my invention is to provide an auxiliary cover for the ice cans in a freezing tank by which the insulating qualities of the ice can tops are supplemented with a corresponding increase in the efficiency of the freezing tank.

Other objects and advantages will appear in the following specification, reference being had to the accompanying drawing in which.

Figure 1:
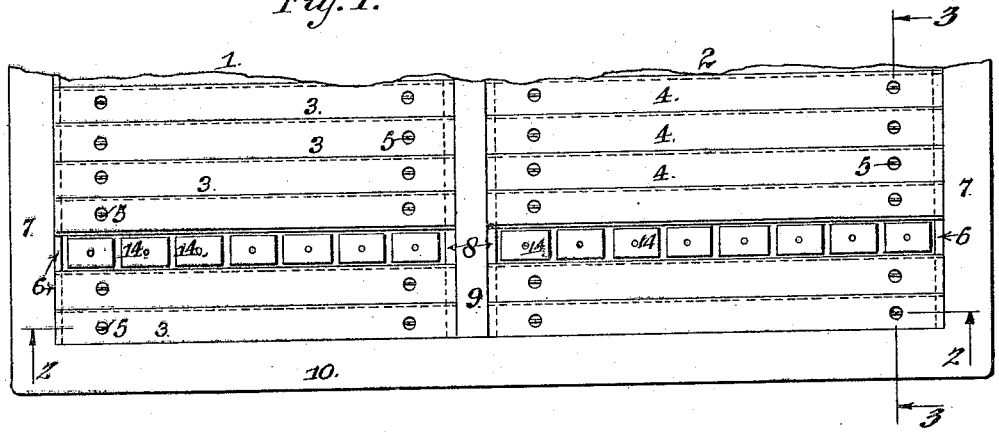
Figure 1 is a plan view of a portion of a freezing tank showing the improved cover sections applied thereto, two of the cover sections being shown removed to reveal the ice cans beneath.

In carrying out my invention I provide auxiliary covers indicated 1 and 2 in Fig. 1 which are made in sections 3 and 4, respectively, and are provided with loops or staples 5 by which the sections of the covers may be lifted.

The cover sections 3 and 4 rest in recesses 6 formed by rabbeting the inside upper edges of the sides 7 of a freezing tank, as shown in Fig. 1. The cover sections 3 and 4 also rest in recesses 8 formed by rabbeting the upper edges of a central guide or division strip 9. The freezing tank shown in Fig. 2, also includes the end wall 10 and bottom 11. The walls of the freezing tank are box-like structures of a suitable material, and are filled with an insulating material as indicated at 12 in Fig. 2, which may consist of cork, mineral wool, etc. It will be observed more particularly in Figs. 2 and 3, that the provision of the cover section recesses 6 and 8 in the side walls and the guide strips 9, makes it possible for the top surfaces of the covers 1 and 2 to come flush with the upper edges of the respective walls of the freezing tank.

A plurality of ice cans 13 which have tops 14 are located in the freezing tank at either side of the guide strip 9. In the present arrangement, the ice cans 13 are arranged in transverse rows of seven cans each on the left side of the guide strip 9, and in transverse rows of eight cans each on the right side of the guide strip 9. There are also seventeen (17) individual rows of cans running lengthwise of the freezing tank, and it will be readily understood from the above taken in connection with Fig. 1, that thirty-four (34) of the cover sections 3 and 4 will be necessary to completely cover all of the cans 13 in the freezing tank. The covers 14 of the freezing cans 13, ordinarily are the only means for insulating the ice in the cans from the heat in the atmosphere outside. The cover sections 3 and 4 of the covers 1 and 2 are designed to supplement the insulating qualities of the can tops 14, and when in place as shown in Fig. 2, virtually form another wall for the freezing tank which is equal in thickness and in all other respects, to the remaining walls of the freezing tank.

Figure 2:
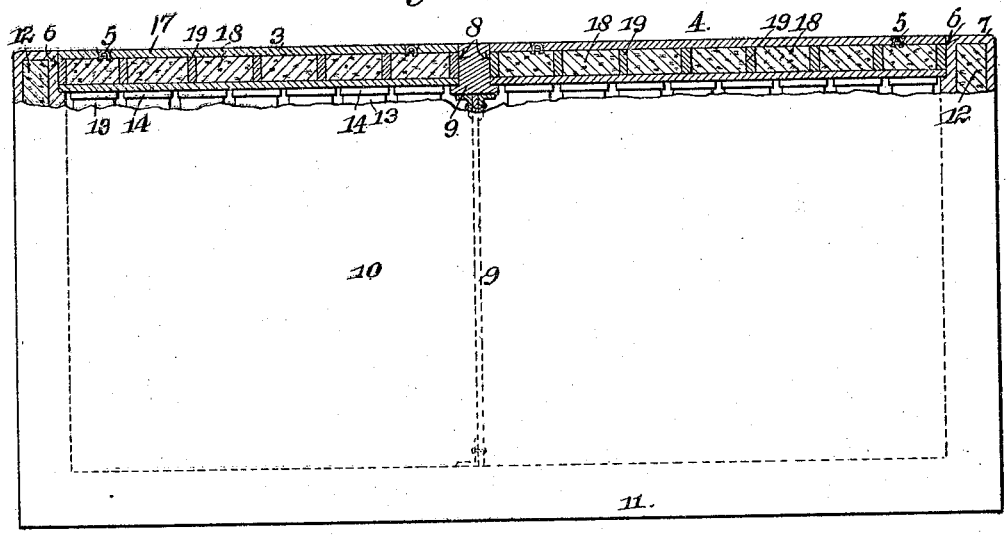
Fig. 2 is a cross section taken substantially on the line 2—2 of Fig. 1, portions being shown in elevation.
Figure 3:
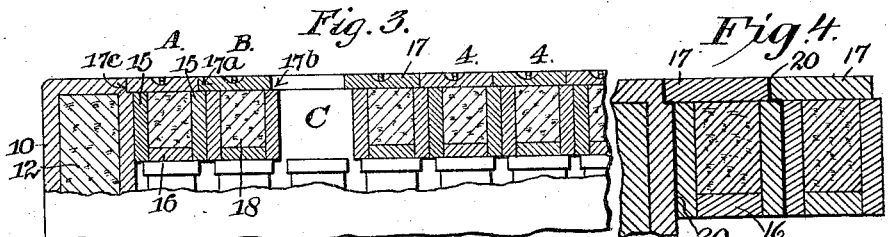
Fig. 3 is a detail cross section on the line 3—3 of Fig. 1.

With regard to the construction of the cover sections 3 and 4, reference is directed to Figs. 2 and 3. Each cover section includes a pair of vertically arranged boards 15, which are spaced apart by a bottom board 16, and taken in connection with a top board 17, form a box-like structure in which insulating material 18 may be packed. The box-like structure of each cover section is, furthermore, provided with transverse insert pieces 19, as shown in Fig. 2. A series of compartments is thus really formed, in which the insulating material 18 is packed. The pieces 19 also form braces for the relatively long cover sections, and obviously the sides are prevented from bulging by said strips when packing the insulating material in place. Referring again to Fig. 3, it will be seen that the cover board 17 does not squarely cover the cover section, but is off-set so that one edge of the cover board 17 extends beyond one of the side boards 15, while the other edge of the top board 17 is correspondingly spaced from the outer surface of the other side board 15. It will be evident that this construction provides a flange 17$^a$ at one side, and a recess 17$^b$ at the other. It will also be understood that the flange 17$^a$ of one cover section, will fit into the recess 17$^b$ of the companion cover section, and thus when all of the sections are in place, unitary cover is provided. The provision of the flanges 17$^a$, also makes it necessary to provide a recess 17$^c$ in the upper, inner edge of the end wall 10.

The application and operation of the improved cover is as follows: The freezing tank shown in the drawing is of any ordinary construction, and no change is made in the tank to accommodate the improved cover, excepting to provide the division strip 9 in substantially the center of the tank, which is adapted to keep the cover sections from lapping by each other, and it also makes it more easy to shift the cover sections from one row of cans to the other, as will presently be explained.

Incidentally, the cover sections may be made of tongue and grooved boards, or of ship lap stuff, cork or other insulating material being packed therebetween as previously set forth. It will be understood, of course, that the actual materials of which the sections are made and the mode of constructing them, cannot be fully set forth here, since this is a matter which is best regulated in the manufacture of the cover sections.

Resuming the operation of the device, the cans 13 are filled with water after having been arranged in suitable rows in the freezing tank, and the can covers 14 put in place. Ordinarily the can covers are the only insulating means in addition to the walls of the freezing tank. The cover sections 3 and 4 of the auxiliary covers 1 and 2 are then applied to the freezing tank. The cover sections rest in the recesses 6 and 8 in the side walls 7 of the freezing tank, and of the guide strip 9, respectively. One cover section covers a single transverse row of cans on either side of the guide strip 9. The water in the ice cans 13 is then frozen into ice.

Now, in the operation of the device, all of the cover sections 3 and 4 are put in place excepting two cover sections at one end of the freezing tank. The act of removing the cakes of ice now commences. Beginning at one of the rows of cans represented A in Fig. 3, the cover section is removed from over the row of cans and is slid or carried to the opposite end where there is no cover section, as just stated. The ice in the row of cans 13 thus exposed, is pulled out and the cans are re-filled with water.

The next cover section B in Fig. 3, is then slid ahead and replaces the cover section A previously removed. The ice in the cans 13 exposed by removing the cover section B, is then pulled and the cans are re-filled with water. The next cover section is then slid forwardly, leaving a vacant space indicated C in Fig. 3. The ice from the exposed cans is pulled, and each step as just enumerated, is repeated throughout the entire length of each section of the freezing tank until all of the cakes of ice are removed. It will be thus understood that after one cover section is removed, the remaining cover sections are simply slid ahead the width of one cover section. Thus only one row of cans is exposed at a time and the obvious benefit of this arrangement is, that all of the cans are not exposed to the heat of the atmosphere, with the consequent saving in ice.

Figure 4:
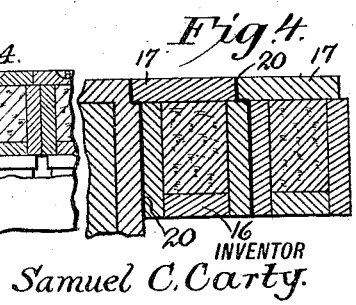
Fig. 4 is a detail section showing joints of elastic material between the cover sections.

In conclusion it may be stated that my improved insulating cover is not confined in use alone to refrigerating apparatus, as described, but may also be used in a furnace to prevent the undesired escape of heat. It may also be applied wherever it be desired to stop the inflow or outflow of heat or cold. The cover sections may have joints of elastic material 20, so arranged to make the cover practically air tight. As shown in Fig. 4, the elastic material is applied to the sides of the sections and in the joints, so that when the sections are pressed together, the elastic material will become compressed and thus form the air tight joint referred to.

While the construction and arrangement of the device as illustrated in the accompanying drawing is that of a generally preferred form, obviously modifications and changes may be made without departing from the spirit of the invention or the scope of the claims.

I claim:

1. In a refrigerating apparatus comprising a freezing tank including side walls and a division strip, the inner edges of the sidewalls and the edges of the division strip being rabbeted to provide cover recesses, said freezing tank being arranged to hold transverse rows of freezing cans, a pair of covers for the tank, each consisting of a plurality of closed box-like sections filled with insulating material and each having its top projecting beyond one side wall and terminating approximately at the outer end of the opposite wall, the sections being arranged to rest in said recesses to form a substantial continuation of the walls of the freezing tank, said sections being disposed over the rows of cans and being shiftable in the recesses from one row to another, the division strip forming a guide preventing the overlapping of the cover sections during the shifting of said sections.

2. In a freezing tank, a cover consisting of elongated sections adapted to be disposed over rows of cans, each section including side and bottom boards, transverse pieces forming braces for the elongated sections, insulating material packed in the spaces between said boards and the transverse pieces, a top board having one edge projecting beyond one of the side boards to form a flange, and the other edge spaced in from the other side board to form a recess, the flanges and recesses of companion cover sections interengaging when the cover is in place, and handles carried by the cover sections.

3. In a freezing tank including a side wall having a longitudinally rabbeted edge, a partition having a companion longitudinally rabbeted edge, a cover adapted to rest in the recesses formed by said rabbets, said cover being composed of sections slidable in said recess, top and side boards included in each section, one edge of the top board projecting beyond one edge of one side board to form a flange, the other edge of the top board being spaced in from the other side board to form a recess, and an elastic material applied to the sides and said edges of the sections, to form an air tight joint when the sections are shifted into contact.

4. A cover for freezing tanks, consisting of a plurality of closed box-like sections filled with insulating material, the top of each section having one edge projecting beyond one side wall of the section and its opposite edge terminating short of the outer face of the opposing side wall of the said section.

SAMUEL C. CARTY.

Attest:
J. F. THOMAS.

Copies of this patent may be obtained for five cents each, by addressing the "Commissioner of Patents, Washington, D. C."